Aug. 6, 1935.     H. WALTER ET AL     2,010,681
BRAKE FOR GYRO STABILIZERS
Filed Jan. 19, 1934     2 Sheets-Sheet 1

INVENTORS
FRANCIS P. HODGKINSON and
HOLLIS WALTER
BY Herbert H. Thompson
THEIR ATTORNEY Aug. 6, 1935.  H. WALTER ET AL  2,010,681
BRAKE FOR GYRO STABILIZERS
Filed Jan. 19, 1934   2 Sheets-Sheet 2
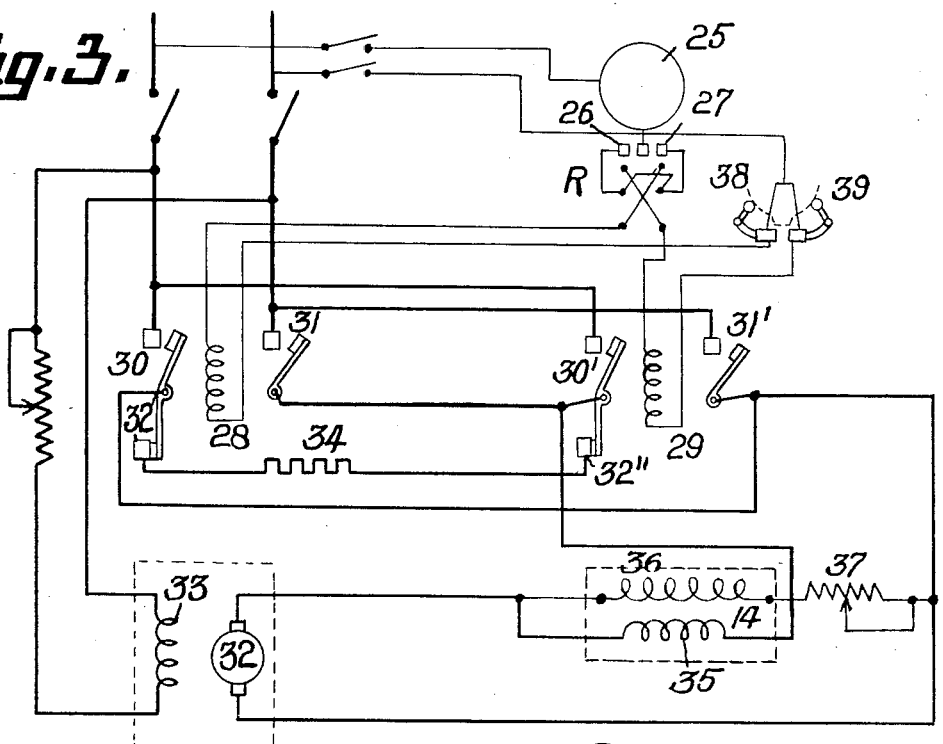
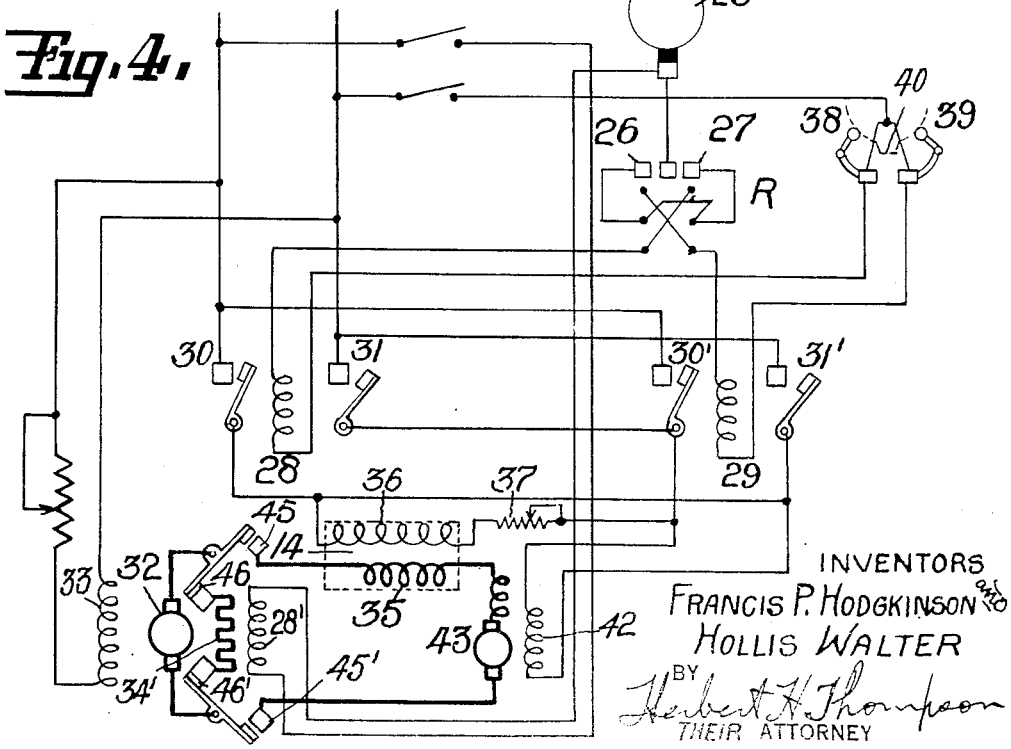
INVENTORS
FRANCIS P. HODGKINSON &
HOLLIS WALTER
BY Herbert H. Thompson
THEIR ATTORNEY Patented Aug. 6, 1935

2,010,681

UNITED STATES PATENT OFFICE

2,010,681

BRAKE FOR GYRO-STABILIZERS

Hollis Walter, Baldwin, and Francis P. Hodgkinson, New York, N. Y., assignors to Sperry Gyroscope Company, Inc., Brooklyn, N. Y., a corporation of New York Application January 19, 1934, Serial No. 707,422

5 Claims. (Cl. 188—172)

This invention relates to the control of heavy gyroscopes used for stabilization of ships. In order to govern such gyroscopes it is necessary to accelerate the precessional movement of the gyroscope at the beginning of the roll, to govern the precessional speed during the cycle and to powerfully brake the same at the end of the roll or when the gyroscope reaches the limit of its precession. It is usual to employ an electric motor for accelerating and a solenoid controlled brake for speed control and braking purposes. Also the accelerating motor may be employed to limit the precessional speed by regenerative action and to assist in the final braking by dynamic braking. When a motor of this character is employed, the control of the solenoid operated brake becomes difficult. Usually such a solenoid is placed in series with the motor armature so as to release the brake against the action of heavy springs when the current flowing therethrough is equal to a predetermined operating current of the motor. Such a construction, however, has the disadvantage that when the precessional speed of the gyroscope picks up and the motor current drops, the brakes go on or drag a certain amount thus absorbing energy which results in wasting the power supplied to the motor in order to maintain the precessional speed. Also, it has been found that in very stormy weather the precessional speed may become sufficient to regenerate sufficient current to reopen the brakes and thus permit the gyroscope to get out of control.

According to our invention, we propose to employ a double wound solenoid on the brake, one winding being connected as described above in series with a motor armature and another winding preferably connected directly across the voltage supplied thereto. By this arrangement and by special design of each coil as hereinafter explained, greatly superior operation is secured which saves power by permitting a portion of the regenerative power being returned to the electrical supply and also by saving the power heretofore required to overcome the drag of the brake. By our invention also smaller brakes may be employed since less heat is generated and all danger of the gyroscope getting out of control avoided.

Referring to the drawings illustrating several forms our invention may assume:

Fig. 3 is a wiring diagram showing our invention as applied to a simple form of precessional motor control.

Fig. 4 is a second diagram showing our invention as applied to a stabilizer having a separate motor or turbo-generator set in which the precession motor is controlled by controlling the field of the generator.

Figure 1:
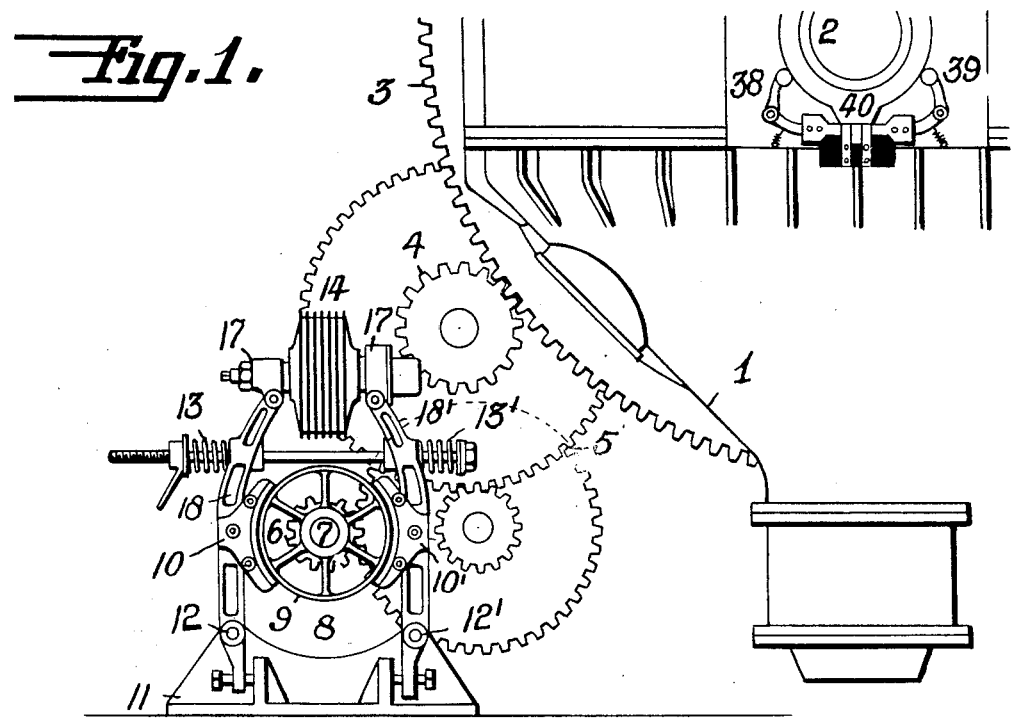
Fig. 1 is a side elevation of the lower portion of a stabilizing gyroscope showing the precession gear and brake.
Figure 2:
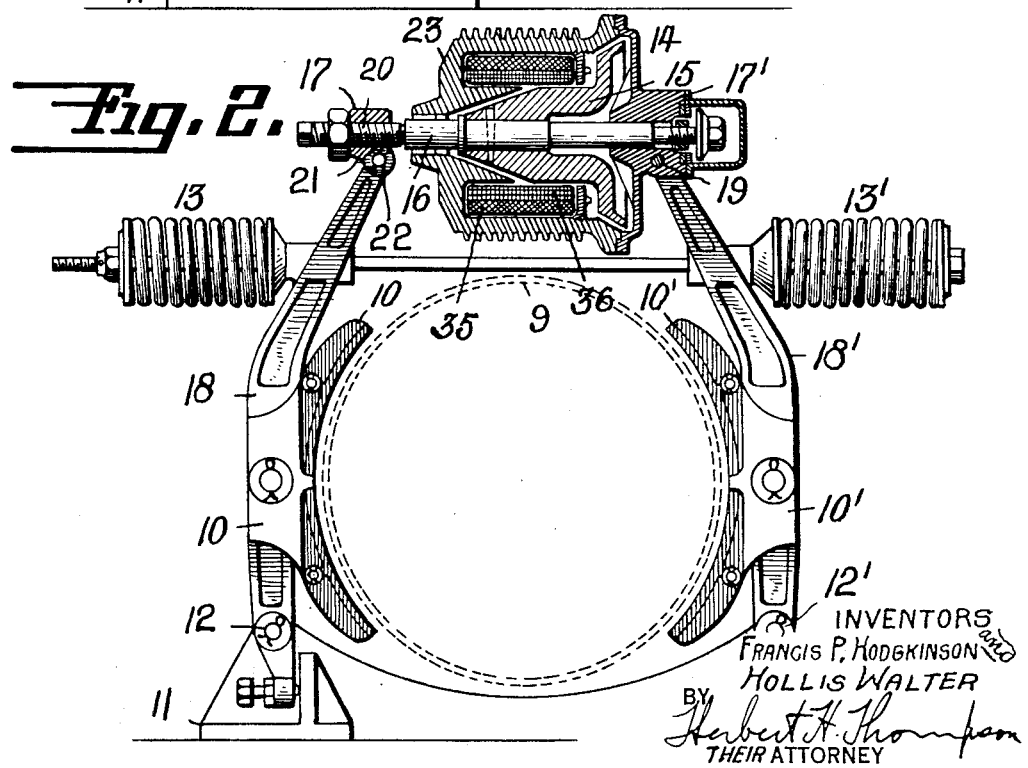
Fig. 2 is an enlarged detail of the brake, the solenoid being shown in section.

A portion of the gyroscopic stabilizer is shown at 1, the gyroscope being mounted on horizontal trunnions 2 for precession. The gyroscopic precession is controlled through a large gear 3 mounted thereon with which meshes a pinion 4 forming a part of step-up gearing 5 leading to pinion 6 on the shaft 7 of precession motor 8. Also mounted on said shaft is a brake drum 9 with which brake shoes 10 and 10' operate to powerfully brake the gyroscope. Such brake shoes are shown as pivoted to the base plate 11 at 12 and 12' and are normally held on to the drum by stiff springs 13 and 13'. The brakes, however, are released by a solenoid magnet 14, the coil supporting member 23 of which is pivotally secured to the upper portion of brake lever 18' by a pin 19. The magnet armature 15 is pinned to shaft 16 which is threaded in a block 21, similarly pinned to the upper portion of brake lever 13 by pin 22. The brake armature shaft 16 is free to slide through block 17' so that the brake may operate as controlled by the magnet solenoid and springs. When the solenoid is excited to an amount so that its pull overcomes the pull of the springs the magnet closes and releases the brake shoes.

The gyroscopic control illustrated is what is known as the active type in which the precession is controlled mainly from a separate, small control gyroscope represented at 25 in the wiring diagram. As said gyroscope precesses to the right or left due to roll in one direction or the other, it closes contacts 26 or 27 to excite one or the other of relay coils 28 or 29. A reversing switch R is shown so that the ship may be either stabilized or artificially rolled, as desired. Each coil, when excited, closes a pair of switches connected thereto, the coil 28 closing the switches 30 and 31 and opening the back contact 32', while the coil 29 closes the switches 30' and 31' and opens the back contact 32''. The front contacts serve to drive the motor armature 32 in one direction or the other, the field 33 being shown as separately excited. The motor is of the constant speed type, so that, when driven overspeed, its counter electromotive force exceeds the impressed E. M. F. so that regeneration results. The back contact when closed completes a circuit through a dynamic brake resistor 34 so that the motor assists in braking the precession gyroscope when its main circuit is interrupted.

The solenoid 14 is shown as having two windings, 35, a heavy winding of few turns in series with the motor armature and 36, a fine winding of a large number of turns which is across the supply but reversed with the armature current so that the two coils normally act in the same direction to hold the brake open. As shown, coil 36 is connected across the armature and is shown as in series with a variable resistance 37. At the start of the precession cycle, when one of switches 26 or 27 is closed by the control gyroscope 25, the pull of both coils assists each other to close the solenoid and release the brake, the brake remaining open until such time as the regenerated current on the precession motor due to excessive precession speed of the main gyroscope is sufficient to produce an opposing flux in the series coil which, in addition to the pull of the springs, will sufficiently nullify the shunt coil flux so that the solenoid opens and the brake closes. The amount of braking will depend upon the amount of regenerative current flowing so that the brakes will float, i. e. adjust themselves to that value of torque necessary to maintain the speed of precession normal. At the end of the cycle, one of limit switches 38 or 39 on the main gyroscope is opened by the cam 40 so as to break the secondary circuit through the holding relay 28 or 29, thus breaking the primary circuit through both the motor and both solenoid coils to cause the brake to be applied full force and also to dynamically brake the motor. The same action would occur if the roll, and hence the control gyro contacts, reversed prior to the main gyroscope reaching a limit switch.

By proper proportioning of the ampere turns of the two coils 35 and 36, the brakes may be caused to remain open and permit a predetermined amount of regenerative power to be pumped back into the electric system for normally large precession speeds. Only when the regenerative current exceeds such value due to excessive precession speeds do the brakes close and retard the precession. Because of the relatively low ampere turns required to hold the magnet closed after once it is energized and closed, the ratio of the shunt coil to the series coil should be relatively high. This will prevent reopening of the brakes on very high regenerative current and thus prevent a condition arising where the gyroscope will get out of control. An accurate control of the amount of regeneration allowed can be readily attained by means of the variable resistance 37. By this means the total ampere turns of the shunt coil can be raised or lowered so as to vary the point at which the magnet releases and closes the brake through a wide range.

Fig. 4 illustrates our invention as applied to a stabilizer using one type of Ward Leonard field control for the generator set 43 driving the precession motor 32. Similar parts are correspondingly numbered to Fig. 3 and will be at once identified. In this case the control gyroscope contacts operate to control directly the direction of current through the field 42 of generator 43 which may be driven by any suitable means, not shown. The armature of said generator is directly coupled to the armature 32 of the precession motor, the field 33 being separately excited as before. In this case the regenerative braking is effected by a separate relay controlled by coil 28' actuated by both control gyro contacts and both limit switches 38 and 39. The front contacts 45 and 45' of said relay are normally closed by the coil 28' but when the circuit through said coil is broken the relays are biased to close the back contacts 46 and 46' which short circuit the armature 32 through the resistance 34'. The series solenoid brake coil 35 is in this case placed directly between the armatures of the generator and motor 43 and 32. The shunt coil 36, as before, is across the supply in such a manner that it is reversed with the reversal of current in the field 42 of the generator. It is therefore shown as controlled from the contacts 30, 31, 30', 31' in parallel with the coil 42.

In accordance with the provisions of the patent statutes, we have herein described the principle and operation of our invention, together with the apparatus which we now consider to represent the best embodiment thereof, but we desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described our invention, what we claim and desire to secure by Letters Patent is:

1. In a gyroscopic stabilizer having a precession motor, a spring applied electro-magnetic brake therefor including a pair of solenoid windings for holding said brake disengaged while the motor is energized, one winding being in series with said motor and the other separately excited, whereby limited regenerative braking by the motor may occur without dragging said brake.

2. In a gyroscopic stabilizer having a precession motor, a spring applied electro-magnetic brake therefor including a pair of solenoid windings for holding said brake disengaged while the motor is energized, one winding being in series with said motor and the other separately excited, whereby limited regenerative braking by the motor may occur without dragging said brake, means for breaking the circuit to said motor and solenoid windings when the limit is reached, and means for simultaneously short-circuiting the motor armature for dynamic braking.

3. In a gyroscopic stabilizer, a precession motor having a separately excited field, reversing control contacts for governing the flow of current through the armature in both directions, a spring applied brake for said stabilizer, a compound wound solenoid for releasing said brake, one winding being in series with said armature and the other across the supply but reversed by said contacts, and the ratio of ampere turns in the two coils being such as to prevent closing of the brakes until predetermined regeneration occurs.

4. A brake for gyroscopic stabilizers as claimed in claim 3 in which the second coil has sufficient ampere turns to prevent reopening of the brakes after closing when the motor is regenerating due to high precessional velocities.

5. An electrical control system of the Ward-Leonard type for gyroscopic stabilizers, comprising a precession motor having a separately excited field, a generator having its armature electrically coupled to the armature of said motor, and a separately excited field, control contacts for governing the excitation of said field in magnitude and direction, a spring applied electro-magnetic brake for the stabilizer including a compound winding for holding said brake disengaged, one part being responsive to the current flow between the motor and generator armatures and the other part separately excited but reversed with the generator field, whereby limited regenerative braking by the motor may occur without dragging said brake.

HOLLIS WALTER.
FRANCIS P. HODGKINSON.